(12) United States Patent
Li et al.

(10) Patent No.: US 8,942,648 B2
(45) Date of Patent: Jan. 27, 2015

(54) DATA TRANSMISSION METHOD IN A RADIO COMMUNICATION SYSTEM

(75) Inventors: Jian-Jun Li, Seongnam-si (KR); Jae-Hyun Ahn, Seoul (KR); Jun-Seong Park, Seongnam-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 861 days.

(21) Appl. No.: 13/143,071

(22) PCT Filed: Dec. 24, 2009

(86) PCT No.: PCT/KR2009/007784
§ 371 (c)(1),
(2), (4) Date: Jun. 30, 2011

(87) PCT Pub. No.: WO2010/077021
PCT Pub. Date: Jul. 8, 2010

(65) Prior Publication Data
US 2011/0269498 A1 Nov. 3, 2011

(30) Foreign Application Priority Data
Dec. 30, 2008 (KR) .................. 10-2008-0137622

(51) Int. Cl.
*H04B 7/02* (2006.01)
*H04B 7/06* (2006.01)
(Continued)

(52) U.S. Cl.
CPC .............. *H04B 7/0689* (2013.01); *H04B 7/024* (2013.01); *H04L 1/0625* (2013.01);
(Continued)

(58) Field of Classification Search
CPC ..... H04B 7/024; H04B 7/0667; H04B 7/0671
USPC ................ 455/101, 103, 115.1; 375/267, 299
See application file for complete search history.

(56) References Cited

U.S. PATENT DOCUMENTS 7,058,367 B1    6/2006  Luo et al.
7,623,590 B2 *  11/2009 Hottinen ........................ 375/267
(Continued)

FOREIGN PATENT DOCUMENTS

KR    1020040103513 A    12/2004
KR    1020050057452 A    6/2005
(Continued)

OTHER PUBLICATIONS
International Search Report for PCT/KR2009/007784 filed on Dec. 24, 2009.
(Continued)

*Primary Examiner* — Duc M Nguyen (57) ABSTRACT

The present invention relates to a data transmission method in a radio communication system, comprising the steps of selecting a first reference transmission antenna of a first base station and a second reference transmission antenna of a second base station from among a plurality of base stations, transmitting a first transmission data stream via the first reference transmission antenna, transmitting a second transmission data stream via the second reference transmission antenna to a terminal, time-delaying the first transmission data stream and retransmitting the delayed first transmission data stream to the terminal via a transmission antenna of a first transmission group, and time-delaying the second transmission data stream and retransmitting the delayed second transmission data stream to the terminal via a transmission antenna of a second transmission group. Thus, co-channel interferences can be minimized, and the efficiency in using an antenna and the receiving performance thereof in a radio communication system adopting a multi-antenna technique and a multi-base station system can be improved at the same time.

9 Claims, 5 Drawing Sheets

(51) Int. Cl.
*H04L 1/06* (2006.01)
*H04L 1/08* (2006.01)
*H04W 28/04* (2009.01)
*H04W 88/08* (2009.01)

(52) U.S. Cl.
CPC ............ *H04B 7/0671* (2013.01); *H04L 1/0668* (2013.01); *H04L 1/08* (2013.01); *H04W 28/04* (2013.01); *H04W 88/08* (2013.01)
USPC ........ 455/101; 455/103; 455/115.1; 375/267; 375/299

(56) References Cited

U.S. PATENT DOCUMENTS

| | | | | |
|---|---|---|---|---|
| 2003/0002568 | A1* | 1/2003 | Dabak et al. | 375/148 |
| 2003/0198282 | A1* | 10/2003 | Tujkovic et al. | 375/146 |
| 2004/0057530 | A1* | 3/2004 | Tarokh et al. | 375/267 |
| 2004/0081073 | A1* | 4/2004 | Walton et al. | 370/204 |
| 2005/0020215 | A1* | 1/2005 | Hottinen | 455/101 |
| 2006/0067421 | A1* | 3/2006 | Walton et al. | 375/267 |
| 2006/0120477 | A1* | 6/2006 | Shen et al. | 375/267 |
| 2006/0280262 | A1* | 12/2006 | Malladi | 375/299 |
| 2007/0248038 | A1 | 10/2007 | Yamasaki et al. | |
| 2008/0130718 | A1* | 6/2008 | Catreux-Erceg et al. | 375/148 |
| 2008/0187136 | A1 | 8/2008 | Zhang et al. | |
| 2009/0010227 | A1* | 1/2009 | Ihm et al. | 370/334 |

FOREIGN PATENT DOCUMENTS

| | | |
|---|---|---|
| KR | 1020060051773 A | 5/2006 |
| KR | 1020060115200 A | 11/2006 |
| KR | 1020070086976 A | 8/2007 |

OTHER PUBLICATIONS

Written Opinion for PCT/KR2009/007784 filed on Dec. 24, 2009.

* cited by examiner

DATA TRANSMISSION METHOD IN A RADIO COMMUNICATION SYSTEM

BACKGROUND ART

The present invention relates generally to an apparatus and method for transmitting data in a radio communication system, and more particularly to an apparatus and method for transmitting data by applying an improved STTD (Space Time Transmit Diversity) scheme in a radio communication system that uses multiple antennas.

BACKGROUND ART

Recently, to meet the increasing need for transmitting a large volume of data over wireless channels at high speed, intensive research is being conducted on multiple antennas technology using several antennas. Also, research on transmission diversity is being conducted to improve wireless channel capacity and reception performance in multiple antennas system.

STTD (Space Time Transmit Diversity) scheme that transmits data by using two transmission antennas and one reception antenna is a kind of transmission diversity scheme. The STTD scheme can simultaneously obtain time diversity gain and space diversity gain by transmitting the same data through two transmission antennas.

Generally, a data transmission method in which one base station (hereinafter, referred to as 'BS') transmits data through two transmission antenna by using the STTD scheme, is illustrated in Table 1. Specifically, the BS transmits data $S_1$ and $S_2$ in order through one transmission antenna and transmits data $-S_2^*$ and $S_1^*$ in order through the other transmission antenna. Herein, '*' denotes conjugate.

TABLE 1

|  | Time t | Time t + T |
|---|---|---|
| The first transmission antenna | $S_1$ | $S_2$ |
| The second transmission antenna | $-S_2^*$ | $S_1^*$ |

As illustrated in Table 1, transmission data are transmitted through the first transmission antenna and the second transmission antenna in time order after STTD encoding. In this case, data $S_1$ and $-S_2^*$ are respectively transmitted through the first and second transmission antennas at time t, and data $S_1^*$ and $-S_2^*$ are respectively transmitted through the first and second transmission antennas at time t+T.

Meanwhile, a multi-BS scheme in which at least two BSs transmit the same data to one mobile station (hereinafter, referred to as 'MS') by using the STTD scheme, has proposed.

In multi-BS scheme, adjacent BSs are set as one BS group, and the MS transmits/receives data with BSs included in the BS group simultaneously. In this case, each BS included in the BS group uses multiple antennas technology, and two or more BSs transmit the same data by using the STTD scheme. In this way, since two or more BSs transmit the same data to one MS, interference which occurs at receiving data of the MS can be decreased.

However, in case that two or more BSs transmit the same data to one MS by using STTD encoding in multi-BS scheme, there is a problem that usage efficiency of BS antennas is decreased since one transmission antenna among two or more transmission antennas of the BS is used and remainder transmission antennas of the BS are not used at transmitting data.

Therefore, there is a demand for data transmission apparatus and method which can increase usage efficiency of BS antennas and improve reception performance in multi-BS scheme.

DISCLOSURE

Technical Problem

Therefore, the present invention has been made in view of the above-mentioned demands, and it is an object of the present invention to provide a data transmission apparatus and method which can increase STTD gain by transmitting the same data to one terminal through a plurality of antennas.

It is another object of the present invention to provide a data transmission apparatus and method which use the improved STTD scheme by together applying STTD scheme and CDD scheme for a plurality of BSs.

Technical Solution

According to one aspect of the present invention, there is provided a method for data transmission in a radio communication system, the method comprising: selecting a first reference transmission antenna of a first base station and a second reference transmission antenna of a second base station from among a plurality of base stations; transmitting a first transmission data stream via the first reference transmission antenna, and transmitting a second transmission data stream via the second reference transmission antenna to a terminal; and retransmitting the first transmission data stream to the terminal via a transmission antenna of a first transmission group, after time-delaying, and retransmitting the second transmission data stream to the terminal via a transmission antenna of a second transmission group, after time-delaying.

Advantageous Effects

The present invention can transmits the same data and retransmits the same data with cyclic delay through a plurality of transmission antennas by using improved STTD scheme, in a radio communication system that uses multiple antennas.

Also, the present invention can increase usage efficiency of BS antennas by transmitting the same data through reference antennas of two transmission groups and retransmitting the cyclic delayed same data through remainder antennas of two transmission groups, in a radio communication system that uses multiple antennas.

In addition, the present invention can improve reception performance by decoding one source data by using reference data simultaneously received from the BSs of two transmission groups and cyclic delayed data of the reference data, in a radio communication system that uses multiple antennas.

DESCRIPTION OF THE DRAWINGS

The above and other aspects, features and advantages of the present invention will become more apparent from the following detailed description when taken in conjunction with the accompanying drawings in which.

MODE FOR INVENTION

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

Figure 1:
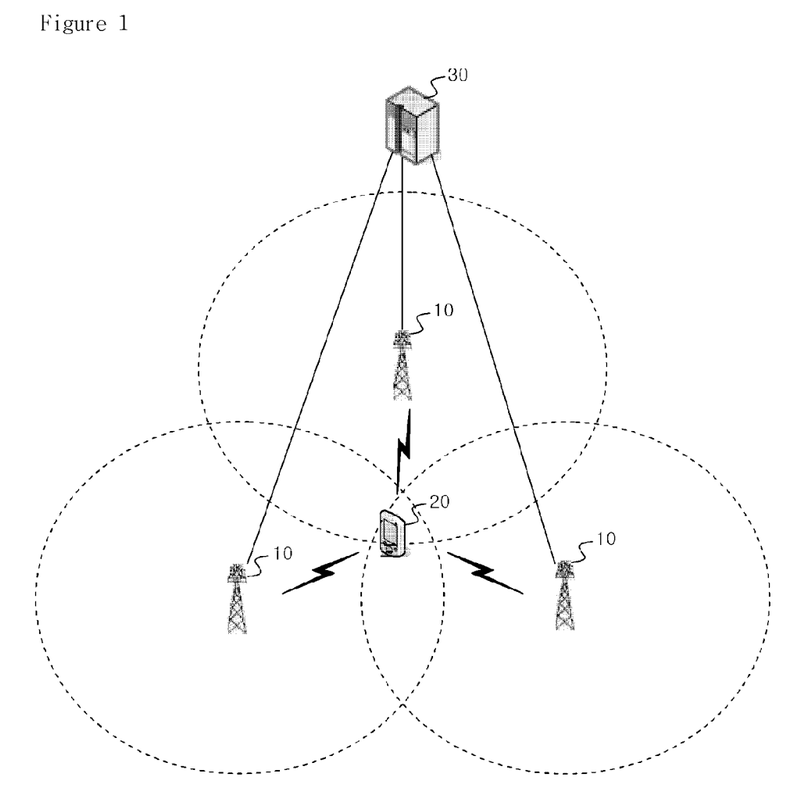
FIG. 1 is a diagram illustrating a structure of a radio communication system according to an embodiment of the present invention.

FIG. 1 is a diagram illustrating a structure of a radio communication system according to an embodiment of the present invention.

Referring to FIG. 1, the radio communication system according to the present invention includes a plurality of BSs 10 which are respectively located in each sector, a terminal 20 which transmits/receives data with the BS 30 through wireless channel, and a BS controller 30 which controls each BS 10.

For reference, in the following description, a detailed description of known functions and configurations of a radio communication system which have low relations with the present invention has been omitted for clarity and conciseness.

In a radio communication system according to an embodiment of the present invention, each BS 10 has multiple antennas, and the MS 20 has multiple antennas.

Referring to FIG. 1, the BS controller 30 manages BSs 10 which are respectively located in each sector, and schedules downlink (hereinafter, referred to as 'DL') data to be transmitted through each BS.

In particular, the BS controller 30 according to the present invention selects a plurality of BSs among all BSs, and respectively transmits the same data to the MS 20 through transmission antennas of the selected BSs. In this case, the BS controller 30 divides the selected BSs into two transmission groups, and controls DL data transmission so as to transmit the same data to the MS 20 by together using the STTD scheme and the CDD scheme. For reference, the CDD (Cyclic Delay Diversity) scheme is a scheme that transmits the same data by applying each time delay for each transmission antenna. The CDD scheme can increase the time diversity gain in reception side since the same data are repeatedly transmitted in different times through different transmission antennas.

The BS controller 30 selects the first antenna that belongs to the first transmission group and the second antenna that belongs to the second transmission group, sets the first antenna and the second antenna as a pair of reference antennas, and transmits conjugate data through the pair of reference antennas. Also, the BS controller 30 transmits time-delayed conjugate data through remainder antennas which respectively belong to the first transmission group or the second transmission group, except the first antenna and the second antenna.

Specifically, the BS controller 30 selects a plurality of BSs 10 that can allocate DL channel for the MS 20 among all BSs, and selects two reference BSs among the selected BSs on the basis of the performances of the DL channels to be allocated to the MS 20.

In this case, the BS controller 30 sets the first antenna and the second antenna which are respectively belong to different BSs, as the pair of reference antennas, based on the performances of the DL channels which are respectively established between the MS and the transmission antennas of the selected BSs. Then, the BS controller 30 sets the first BS equipped with the first antenna and the second BS equipped with the second antenna, as reference BSs respectively.

The BS controller 30 divides a plurality of BSs into two transmission groups on the basis of two reference BSs, firstly transmits conjugate data of the same data through the pair of the reference antennas, and transmits conjugate data with cyclic delay through remainder antennas which belong to the first and second transmission groups.

The MS 20 receives conjugate data which are transmitted from each BSs of two transmission groups. In this case, the MS according to the present invention receives reference conjugate data transmitted from the pair of the reference antennas and receives cyclic delayed conjugate data transmitted from remainder antennas after delayed time. The MS 20 decodes the reference conjugate data and the cyclic delayed conjugate data based on the STTD decoding scheme to generate source data. In this way, since the decoding for the source data is performed by using not only the reference conjugate data but also the cyclic delayed conjugate data, the MS can perform an improved STTD decoding to increase transmission diversity.

Meanwhile, although FIG. 1 illustrates that one BS controller 30 manages a plurality of BSs 10, it is possible to implement that a plurality of BS controllers 30 respectively manage at least one BS 30 according to service area.

Hereinafter, with reference to FIGS. 2 to 5, a data transmission apparatus and method using improved STTD scheme according to an embodiment of the present invention will now be described.

Figure 2:
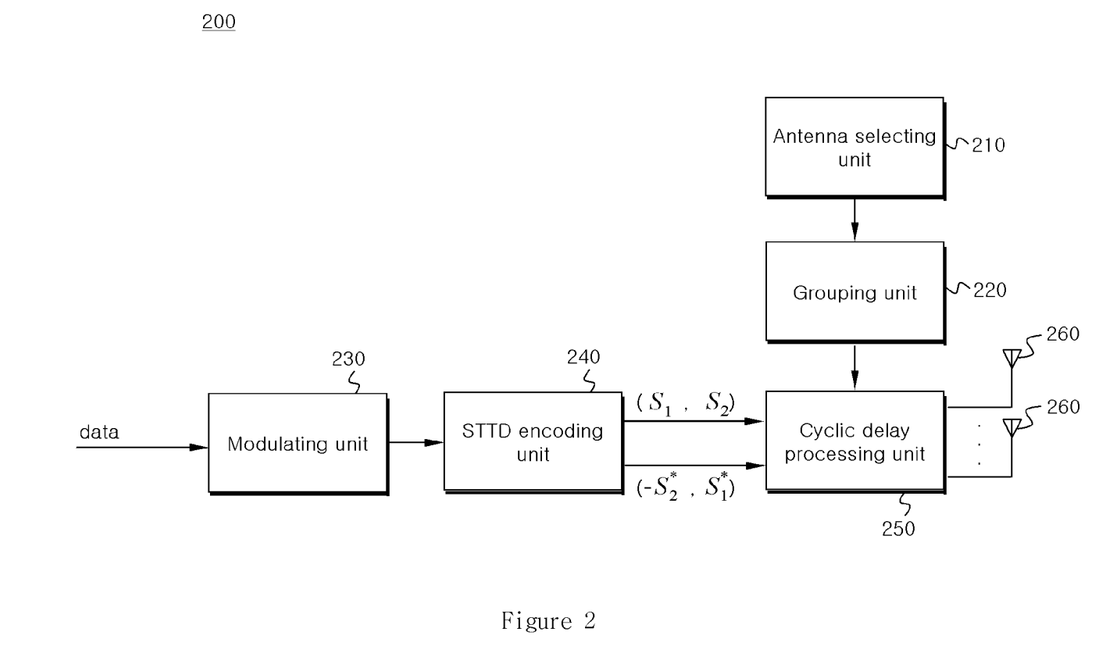
FIG. 2 is a diagram illustrating a structure of a data transmission apparatus according to an embodiment of the present invention.

FIG. 2 is a diagram illustrating a structure of a data transmission apparatus according to an embodiment of the present invention.

Referring to FIG. 2, the data transmission apparatus 200 according to the present invention includes an antenna selecting unit 210, a grouping unit 220, a modulating unit 230, a STTD encoding unit 240, a cyclic delay processing unit 250, and a plurality of transmission antennas 260.

The data transmission apparatus 200 can be implemented as a part of the BS 20 and/or the BS controller 30 in a radio communication system, and also can be implemented as an individual apparatus in a radio communication system. For reference, in the following description, a detailed description of known functions and configurations of the BS and the BS controller has been omitted for clarity and conciseness. For reference, in the following description, a detailed description of known functions and configurations of the BS and the BS controller which have low relations with the present invention has been omitted for clarity and conciseness.

The antenna selecting unit 210 selects transmission antennas which transmit the same data, among transmission antennas 260 which are belonged to the BSs and/or the BS controller and have channel with the MS. In this case, the antenna selecting unit 210 can select transmission antennas which have the performance of the DL channel with the MS 20 better than the predetermined reference performance, among a plurality of transmission antennas 260. For reference, the performance of the DL channel can be recognized through the CINR (Carrier to Interference and Noise Ratio) of the DL channel with the MS 20.

For example, the antenna selecting unit 210 respectively compares the CINR for each transmission antenna with the reference CINR. In this case, the antenna selecting unit 210 can select transmission antennas which have the CINR greater than the reference CINR, and can also select transmission antennas according to the priority order of the DL channel performance.

The grouping unit 220 divides a plurality of transmission antennas selected by the antenna selecting unit 210 into two transmission groups according to DL channel performance information and BS information. In this case, the grouping unit 220 can group all of the selected transmission antennas into two transmission groups, or can group transmission antennas which have the DL channel performance better than the reference channel performance, among all of the selected transmission antennas, into two transmission groups. Herein, the reference channel performance denotes a level that corresponds to permissible interference in DL channel for the MS.

Specifically, according to the priority order of the DL channel performance, the grouping unit 220 determines from transmission antenna having the highest order to antenna having the determined order into the first transmission group, among a plurality of antennas selected by the antenna selecting unit 210, and determines remainder antennas into the second transmission group. In this case, the grouping unit 220 can determine from transmission antenna having the highest order to antenna having the determined order into the first and second transmission groups. Then, the grouping unit 220 can select a transmission antenna having the highest DL channel performance from the first transmission group and a transmission antenna having the highest DL channel performance from the second transmission group, and sets the selected two antennas as a pair of the reference antennas.

Also, the grouping unit 220 can select a pair of the reference antennas based on the DL channel performance, among a plurality of antennas selected by the antenna selecting unit 210, and divide a plurality of antennas into the first and second transmission groups, on the basis of a pair of the reference antennas. In this case, the grouping unit 220 can select a transmission antenna having the highest DL channel performance and a transmission antenna having the second-highest DL channel performance, as a pair of the reference antennas.

Meanwhile, in case that the grouping unit 220 determines two transmission groups based on BS information, the grouping unit 220 can determine two BSs which have a plurality of transmission antennas respectively as two transmission groups or determine a plurality of BSs as two transmission groups by dividing a plurality of BSs into two groups.

In this way, the grouping unit 220 according to the present invention can apply various transmission antenna grouping schemes to obtain the highest transmission diversity gain, when transmitting the same data through two transmission groups by using the STTD scheme.

The grouping unit 220 transmits reference antenna information and each transmission antenna information for two transmission groups to the cyclic delay processing unit 250.

Meanwhile, the modulating unit 230 modulates data to be transmitted to the MS 20 according to the determined modulation scheme, and outputs the modulated data to the STTD encoding unit 240. In this case, the modulating unit 230 determines the modulation scheme by referring to the MCS level corresponding to the DL CINR received from the MS 20.

The STTD encoding unit 240 performs STTD encoding for the modulated data, and sends STTD encoded two data streams to the cyclic delay processing unit 250. For example, as illustrated in FIG. 2, the STTD encoding unit 240 performs STTD encoding for input data ($S_1$, $S_2$) to generate the first data stream ($S_1$, $S_2$) and the second data stream ($-S_2^*$, $S_1^*$), and sends the first data stream ($S_1$, $S_2$) and the second data stream ($-S_2^*$, $S_1^*$) to the cyclic delay processing unit 250.

The cyclic delay processing unit 250 transmits two data streams with cyclic delay, through transmission antennas included in the first and second transmission groups.

Specifically, the cyclic delay processing unit 250 receives the reference antenna information and each transmission antenna information for two transmission groups from the grouping unit 220, and transmits the first data stream through transmission antennas of the first transmission group and the second data stream through transmission antennas of the second transmission group, by using the reference antenna information and each transmission antenna information for two transmission groups.

In this case, the cyclic delay processing unit 250 firstly transmits two transmission data streams through a pair of the reference antennas among transmission antennas included in two transmission groups. The, the cyclic delay processing unit 250 determines data transmission order for remainder transmission antennas except a pair of the reference antennas among transmission antennas included in two transmission groups, and transmits two transmission data streams through by applying different delay time for each remainder transmission antenna according to the data transmission order.

For example, the cyclic delay processing unit 250 simultaneously transmits the first and second data streams respectively through the first transmission antenna of the first transmission group and the second transmission antenna of the second transmission group. Thereafter, the cyclic delay processing unit 250 transmits the first and second data streams respectively through at least one antenna among remainder transmission antennas of the first transmission group and at least one antenna among remainder transmission antennas of the second transmission groups, except the first and second transmission antennas, with different delay times, according to the data transmission order determined based on the DL channel performance.

In this case, the cyclic delay processing unit 250 includes a plurality of delay units (not shown) in which different delay times are set, to perform cyclic delay transmission for each transmission group. Then, the cyclic delay processing unit 250 sets each delay time of each delay unit differently, and performs cyclic delay transmission for remainder transmission antennas according to the data transmission order, referring to each delay time of each delay unit.

Hereinafter, with reference to FIGS. 3 and 4, data transmission schemes with STTD and CDD according to the present invention will now be described.

Figure 3:
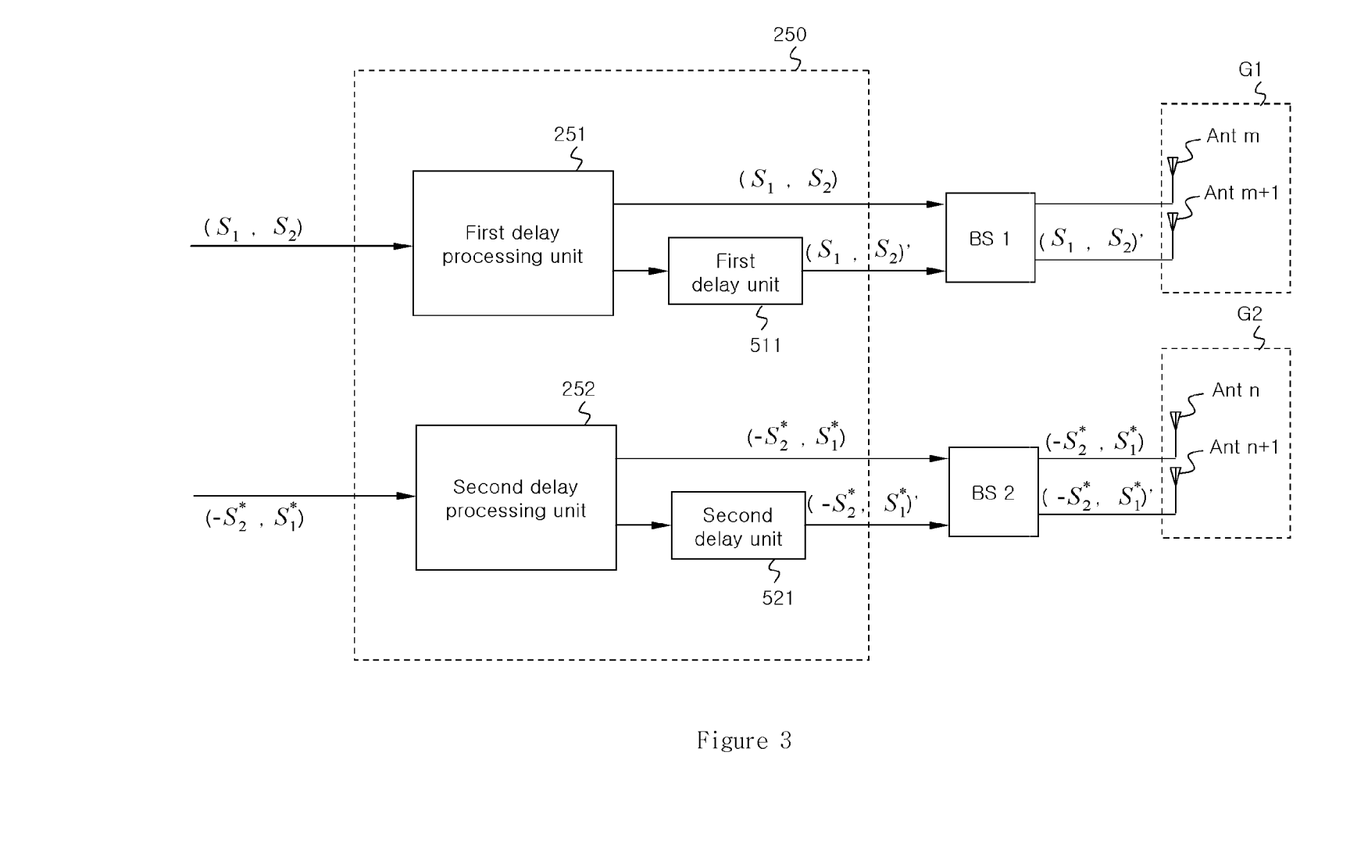
FIG. 3 is a diagram illustrating the first data transmission scheme according to an embodiment of the present invention.

FIG. 3 is a diagram illustrating the first data transmission scheme according to an embodiment of the present invention.

For reference, FIG. 3 illustrates that the grouping unit 220 groups two BSs which are equipped with best two transmission antennas among a plurality of antennas selected by the antenna selecting unit 210, as two transmission groups. In this case, the grouping unit 220 groups transmission antennas so that each remainder transmission antennas of the BSs with a pair of the reference antennas (Ant m, Ant n) are respectively included in each corresponding transmission group.

Referring to FIG. 3, the first transmission group (G1) includes two transmission antennas (Ant m, Ant m+1) of the first BS (BS1) and the second transmission group (G2) includes two transmission antennas (Ant n, Ant n+1) of the second BS (BS2). For reference, the grouping unit 220 can group transmission antennas so that transmission antennas of other BSs except the first and second BSs (BS1, BS2) are included in two transmission groups.

In state that the first and second transmission groups (G1, G2) have been grouped, the STTD encoding unit 240 performs STTD encoding for transmission data to generate the first data stream ($S_1$, $S_2$) and the second data stream ($-S_2^*$, $S_1^*$), and sends the first data stream ($S_1$, $S_2$) and the second data stream ($-S_2^*$, $S_1^*$) to the cyclic delay processing unit 250. Then, the first data stream ($S_1$, $S_2$) is inputted to the first delay processing unit 251 of the cyclic delay processing unit 250, and the second data stream ($-S_2^*$, $S_1^*$) is inputted to the second delay processing unit 252 of the cyclic delay processing unit 250. In this case, the first delay processing unit 251 and the second delay processing unit 252 have stored information about transmission antennas belong to the first transmission group, information about transmission antennas belong to the second transmission group, and information about the reference antennas.

The first delay processing unit 251 transmits the first data stream ($S_1$, $S_2$) through the reference antenna (Ant m) of the first transmission group (G1), and transmits the delayed first data stream ($S_1$, $S_2$)' through remainder antenna (Ant m+1) of the first transmission group (G1) after delay time that is set by the first delay unit 511.

The second delay processing unit 252 transmits the second data stream ($-S_2^*$, $S_1^*$) through the reference antenna (Ant n) of the second transmission group (G2) at the same time of transmitting the first data stream, and transmits the delayed second data stream ($-S_2^*$, $S_1^*$)' through remainder antenna (Ant n+1) of the second transmission group (G2) after delay time that is set by the second delay unit 521. In this case, each delay time of the first delay unit 511 and the second delay unit 521 can be set differently.

Figure 4:
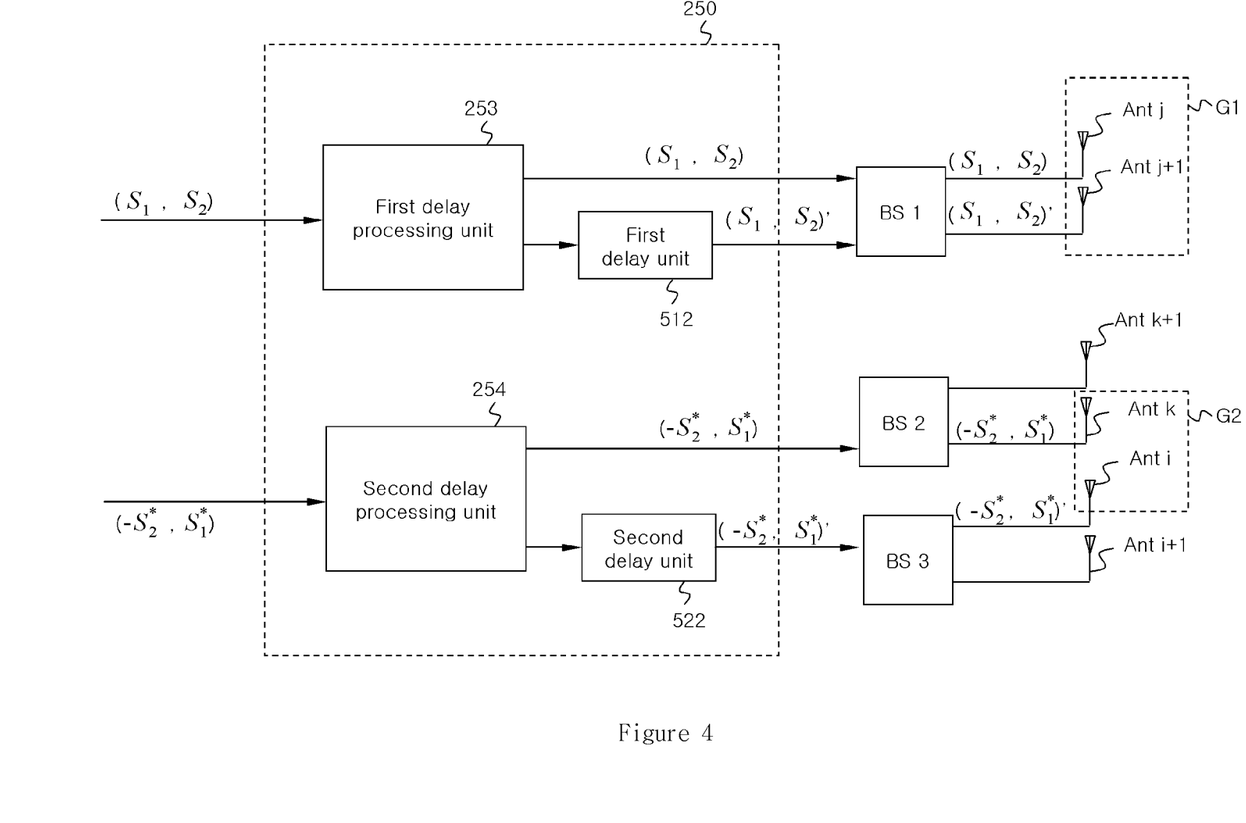
FIG. 4 is a diagram illustrating the second data transmission scheme according to another embodiment of the present invention.

FIG. 4 is a diagram illustrating the second data transmission scheme according to another embodiment of the present invention.

For reference, FIG. 4 illustrates that the grouping unit 220 determines the determined number of transmission antennas according to the priority order of the DL channel performance into the first transmission group (G1), and determines remainder transmission antennas into the second transmission group (G2).

In this case, the grouping unit 220 selects reference antenna (Ant j) having the highest DL channel performance among transmission antennas of the first BS (BS1) belong to the first transmission group (G1), and selects reference antenna (Ant k) having the highest DL channel performance among transmission antennas of the second BS (BS2) belong to the second transmission group (G2). For reference, in FIG. 4, the transmission antenna (Ant k) of the second BS (BS2) is selected as the reference antenna of the second transmission group (G2), and the transmission antenna (Ant i) of the second BS (BS2) is selected as the remainder antenna of the second transmission group (G2).

In state that the first and second transmission groups (G1, G2) have been grouped, the STTD encoding unit 240 performs STTD encoding for transmission data to generate the first data stream ($S_1$, $S_2$) and the second data stream ($-S_2^*$, $S_1^*$), and sends the first data stream ($S_1$, $S_2$) and the second data stream ($-S_2^*$, $S_1^*$) to the cyclic delay processing unit 250.

Then, the first data stream ($S_1$, $S_2$) is inputted to the first delay processing unit 253 of the cyclic delay processing unit 250, and the second data stream ($-S_2^*$, $S_1^*$) is inputted to the second delay processing unit 254 of the cyclic delay processing unit 250.

The first delay processing unit 253 transmits the first data stream ($S_1$, $S_2$) through the reference antenna (Ant j) of the first transmission group (G1), and transmits the delayed first data stream ($S_1$, $S_2$)' through remainder antenna (Ant j+1) of the first transmission group (G1) after delay time that is set by the first delay unit 512.

The second delay processing unit 254 transmits the second data stream ($-S_2^*$, $S_1^*$) through the reference antenna (Ant k) of the second transmission group (G2) at the same time of transmitting the first data stream, and transmits the delayed second data stream ($-S_2^*$, $S_1^*$)' through remainder antenna (Ant i) of the second transmission group (G2) after delay time that is set by the second delay unit 522. In this case, each delay time of the first delay unit 512 and the second delay unit 522 can be set differently.

Meanwhile, according to further other embodiments of the present invention, the grouping unit 220 can perform grouping so that the first and second transmission groups (G1, G2) further include at least one transmission antenna belong to at least one other BS except the first BS (BS1) and the second and third BSs (BS2. BS3). Also, the grouping unit 220 can perform grouping so that the first transmission group (G1) further includes all transmission antennas belong to another BS except the first BS (BS1) and the second transmission groups (G2) further includes all transmission antenna belong to further another BS except the second and third BSs (BS2. BS3). In addition, the grouping unit 220 can perform grouping so that the first transmission group (G1) further includes one transmission antennas among all transmission antennas belong to another BS except the first BS (BS1) and the second transmission groups (G2) further includes one transmission antenna among all transmission antenna belong to further another BS except the second and third BSs (BS2. BS3).

For example, if the grouping unit 220 performs grouping for the first transmission group (G1) to include transmission antennas of the first BS (BS1) and transmission antenna of another BS (not shown), the first delay processing unit 253 transmits the first data stream ($S_1$, $S_2$) through the reference antenna (Ant j) of the first BS (BS1), transmits the first-delayed first data stream ($S_1$, $S_2$)' through remainder antenna (Ant j+1) of the first BS (BS1) after the first delay time, and transmits the second-delayed first data stream ($S_1$, $S_2$)" through another remainder antenna of another BS (not shown) after the second delay time.

Also, if the grouping unit 220 performs grouping for the second transmission group (G2) to include transmission antennas of the second and third BSs (BS2, BS3) and transmission antenna of further another BS (not shown), the second delay processing unit 254 transmits the second data stream ($-S_2^*$, $S_1^*$) through the reference antenna (Ant k) of the second BS (BS2), transmits the first-delayed second data stream ($-S_2^*$, $S_1^*$)' through remainder antenna (Ant i) of the third BS (BS3) after the first delay time, and transmits the second-delayed second data stream ($-S_2^*$, $S_1^*$)" through further another remainder antenna of further another BS (not shown) after the second delay time.

Meanwhile, FIGS. 3 and 4 illustrate that the grouping unit 220 performs grouping for two groups to include two transmission antennas respectively. However, according to further another embodiment of the present invention, the grouping unit 220 can change the number of transmission groups and the number of transmission antennas according to the number of reception antennas of the MS.

Figure 5:
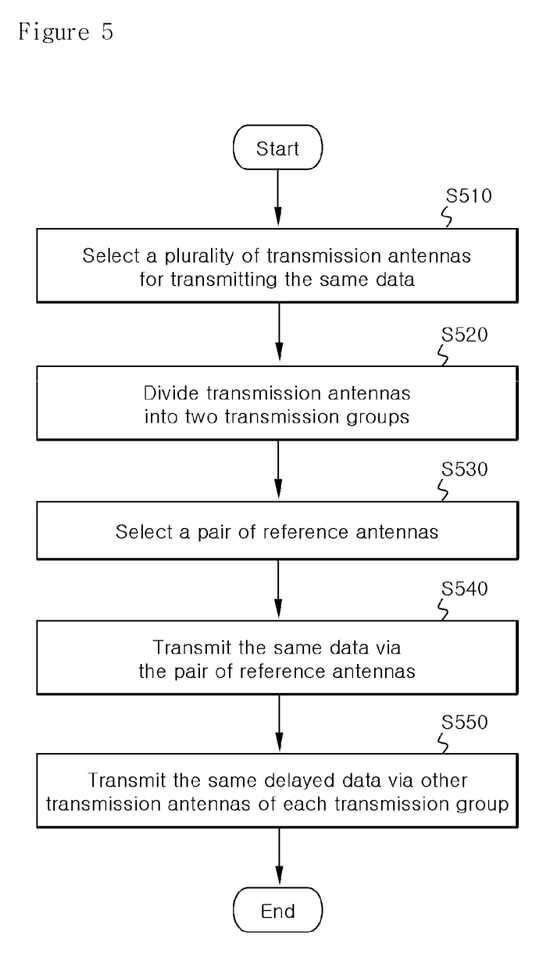
FIG. 5 is a flowchart illustrating a data transmission method according to an embodiment of the present invention.

FIG. 5 is a flowchart illustrating a data transmission method according to an embodiment of the present invention.

Referring to FIG. 5, in Step S510, the data transmission apparatus selects a plurality of transmission antennas included in a plurality of BSs to transmit the same data through a plurality of transmission antennas. In this case, a plurality of BSs are respectively equipped with a plurality of transmission antennas, and the data transmission apparatus selects transmission antennas which have the DL channel performance better than the reference channel performance. For reference, the DL channel performance can be recognized based on the CINR for each transmission antenna.

Then, in Step S520, the data transmission apparatus divides the selected transmission antennas into two transmission groups according to the DL channel performance for each transmission antenna. In this case, the selected transmission antennas can be divided into two transmission groups based on BS information, and two transmission groups can be classified based on the priority order of the DL channel performance.

Thereafter, in Step S530, the data transmission apparatus selects two transmission antennas which respectively belong to different transmission groups, as a pair of reference antennas. In this case, the data transmission apparatus can select antennas having the highest DL channel performance in each transmission group, among the selected transmission antennas, as the reference antennas.

Thereafter, in Step S540, the data transmission apparatus simultaneously transmits a pair of conjugate data of the same data through a pair of reference antennas.

Then, in Step S550, the data transmission apparatus transmits conjugate data of the same data with cyclic delay scheme, through remainder antennas that respectively belong to each transmission group. In this case, the data transmission apparatus transmits a pair of data through the reference antennas of two transmission groups, and transmits a pair of conjugate data through remainder antennas of two transmission groups by respectively applying different delay times. Herein, each delay time for remainder antennas is set in various schemes. Also, data that are transmitted through two transmission groups are a pair of conjugate data that are encoded by STTD encoding scheme, and a pair of conjugate data are transmitted through two transmission groups, as a form of data stream.

In this way, since the present invention divides a plurality of transmission antennas into two transmission groups and transmits STTD encoded data by applying cyclic delay for each transmission group, the present invention can effectively use transmission antennas included in each BS and can increase the reception performance of the MS.

While the invention has been shown and described with reference to a certain preferred embodiment thereof, it will be understood by those skilled in the art that various changes in form and details may be made therein without departing from the spirit and scope of the invention as defined by the appended claims.

The invention claimed is:

1. A method for data transmission in a radio communication system, the method comprising:
    selecting a first reference transmission antenna of a first base station and a second reference transmission antenna of a second base station from among a plurality of base stations;
    transmitting a first transmission data stream via the first reference transmission antenna, and transmitting a second transmission data stream via the second reference transmission antenna to a terminal; and
    retransmitting the first transmission data stream to the terminal via a transmission antenna of a first transmission group, after time-delaying, and retransmitting the second transmission data stream to the terminal via a transmission antenna of a second transmission group, after time-delaying
    wherein the number of transmission antennas for each transmission group is determined based on the number of reception antennas of the terminal.

2. The method of claim 1, wherein the step of retransmitting comprises:
    time-delaying the first transmission data stream with a first delay time, and time-delaying the second transmission data stream with a second delay time, wherein the first delay time is different from the second delay time.

3. The method of claim 1, wherein the first reference transmission antenna and the second reference transmission antenna respectively transmit the first transmission data stream and the second transmission data stream by using STTD (Space Time Transmit Diversity) scheme.

4. The method of claim 1, wherein the first transmission data stream and the second transmission data stream are conjugate data streams.

5. The method of claim 1, wherein the first reference transmission antenna and the second reference transmission antenna are selected from different base stations, considering a downlink channel performance.

6. The method of claim 1, wherein the transmission antenna of the first transmission group is at least one transmission antenna selected from the first transmission group and the transmission antenna of the second transmission group is at least one transmission antenna selected from the second transmission group.

7. The method of claim 1, wherein the transmission antenna of the first transmission group is at least one transmission antenna selected from transmission antennas except the first reference transmission antenna among transmission antennas belong to the first transmission group and the transmission antenna of the second transmission group is at least one transmission antenna selected from transmission antennas except the second reference transmission antenna among transmission antennas belong to the second transmission group.

8. A method for data transmission in a radio communication system, the method comprising:
    selecting a first reference transmission antenna of a first base station and a second reference transmission antenna of a second base station from among a plurality of base stations;
    grouping the plurality of base stations into a first transmission group and a second transmission group according to the priority order of downlink channel performance, wherein the first base station belongs to the first transmission group and the second base station belongs to the second transmission group;
    transmitting a first transmission data stream via the first reference transmission antenna, and transmitting a second transmission data stream via the second reference transmission antenna to a terminal; and
    retransmitting the first transmission data stream to the terminal via a transmission antenna of a first transmission group, after time-delaying, and retransmitting the second transmission data stream to the terminal via a transmission antenna of a second transmission group, after time-delaying.

9. A method for data transmission in a radio communication system, the method comprising:
    selecting a first reference transmission antenna of a first base station and a second reference transmission antenna of a second base station from among a plurality of base stations, and grouping a plurality of transmission antennas included in the plurality of base stations into a first transmission group and a second transmission group, wherein the first reference transmission antenna belongs to the first transmission group and the second reference transmission antenna belongs to the second transmission group;

transmitting a first transmission data stream via the first reference transmission antenna, and transmitting a second transmission data stream via the second reference transmission antenna to a terminal; and retransmitting the first transmission data stream to the terminal via a transmission antenna of a first transmission group, after time-delaying, and retransmitting the second transmission data stream to the terminal via a transmission antenna of a second transmission group, after time-delaying, wherein the step of grouping comprises:

determining from a transmission antenna having the highest order to a transmission antenna having the determined order into the first transmission group, among a plurality of transmission antennas, and determining remainder antennas except the transmission antennas of the first transmission group into the second transmission group.

* * * * *